W. WELLS.
MACHINE FOR MIXING AND KNEADING DOUGH.
No. 43,445. Patented July 5, 1864.
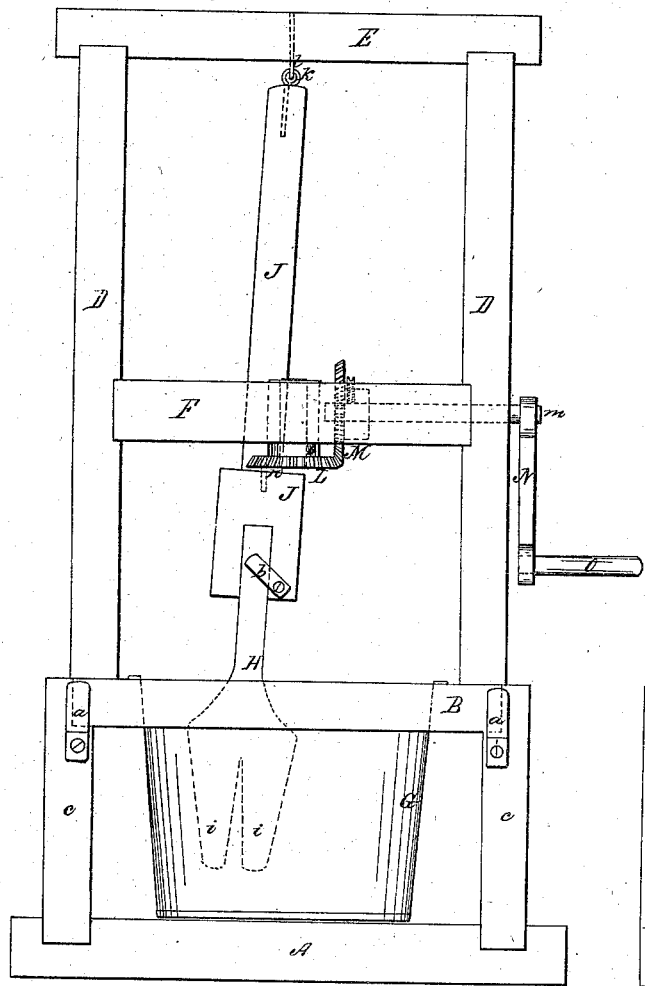
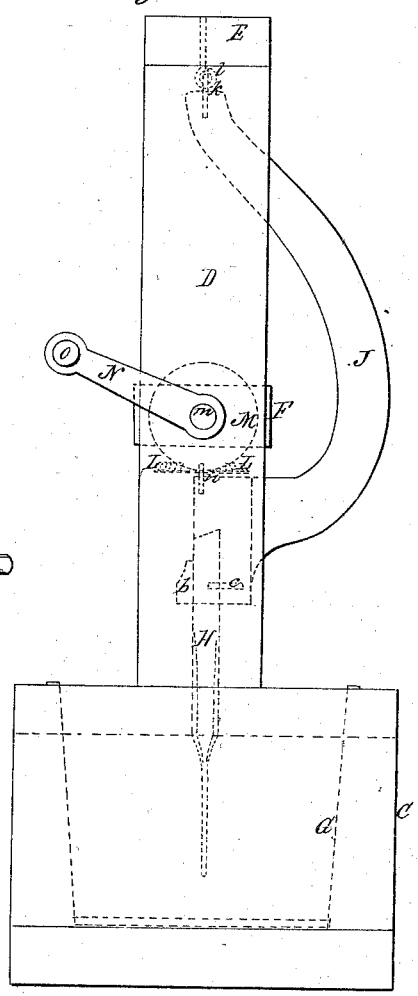
Witnesses:
N. Ames
A. F. Badger
Inventor:
William Wells

UNITED STATES PATENT OFFICE.

WILLIAM WELLS, OF MIDDLETON, MASSACHUSETTS.

IMPROVED MACHINE FOR MIXING AND KNEADING DOUGH.

Specification forming part of Letters Patent No. 43,145, dated July 5, 1864.

*To all whom it may concern:*

Be it known that I, WILLIAM WELLS, of Middleton, in the county of Essex and State of Massachusetts, have invented a new and useful Machine for Mixing and Kneading Dough; and I do hereby declare that the following is a full, clear, and exact description of the construction and operation of the same, reference being had to the accompanying drawings, forming a part of this specification, in which—

Figure 1 is a front elevation, and Fig. 2 is a side view, of the same.

Like parts are indicated by the same letters in both drawings.

The nature of my invention consists in moving, by any suitable mechanical means, a two-edged blade or spatula within a suitable vessel, so as to rotate, squeeze, and cut the dough or materials to be mixed and kneaded in nearly the same manner as they are by a knife or spoon in a person's hand, whereby I am enabled to perform the operation of mixing and kneading dough, &c., much more rapidly, easily, and neatly than by the usual method.

To enable others skilled in the art to make and use my invention, I will now describe its construction and operation.

The frame of the machine may be made of wood or iron, and consists of the bottom piece, A, the table B, supported by the two sides, C C, the two uprights, D D, fast to the top of the table B, and the top piece, E, and center piece, F, uniting the two uprights, D D, as represented in Fig. 1. Through the table B is a round hole of the proper diameter to receive the mixing and kneading vessel G, which may be made of tin or other suitable materials, and shaped as shown in Fig. 1.

To facilitate the insertion and removal of the vessel G, the front portion of the table B is made removable, being confined in place by means of the buttons $a\ a$.

J is a pendent arm (the shape of which is clearly shown in the drawings) attached to the center of the top piece, E, by means of the universal joint or links $k$ and $l$. The lower end of J is provided with a longitudinal slot of the suitable dimensions to receive the upper end of the blade or spatula H, which is held in place by means of the button $b$ and pin $c$. (See Fig. 2.)

L is a beveled pinion turning on the axle $o$, which enters the center piece, F, of the frame, as shown in Fig. 1, and engaging with pinion L is a similar pinion, M, fast to its horizontal axle $m$ and turning in a slot in the center piece, F, N being a crank and O a handle to the same, by means of which the pinions are driven by hand; or a pulley may be substituted for the crank and the machine may be driven by steam or other power when required.

$n$ is a small pin projecting from the arm J, as shown in the drawings, and entering a hole one side of the center of the pinion L, whereby it is obvious that the arm J will be carried round in a circle.

The general shape and size of the mixing and kneading blade or spatula H are shown in the drawings, the lower part, $i\ i$, being divided, so that the flat side of the blade may pass with less resistance through the mixture. An undivided blade, however, for many purposes will answer equally well.

The materials being placed in the vessel G, a person can perform the operation of mixing and kneading them by simply turning the crank N, and many times faster, as well as with less power, than by the usual method, to say nothing of the greater neatness of keeping hands and finger-nails away from the dough.

As the blade H is carried in a circle round the inside of the vessel G without an axial revolution, its action on the mass to be mixed or kneaded resembles that of a knife or spoon in a person's hand, rotating, squeezing, and cutting the same until the operation is completed and the kneaded dough becomes conglomerated round the blade, which may be readily removed by turning the button $b$.

Having thus described the nature and operation of my invention, what I claim as new, and desire to secure by Letters Patent, is—

Carrying round the blade or spatula H by any mechanical means within a suitable vessel, G, so as to rotate, squeeze, and cut the materials to be mixed or kneaded, substantially as and for the purpose described.

WILLIAM WELLS.

Witnesses:
N. AMES,
A. F. BADGER.